(12) United States Patent
French

(10) Patent No.: US 12,037,856 B2
(45) Date of Patent: Jul. 16, 2024

(54) MUD GAS SEPARATOR DESIGN WHICH PREVENTS GAS FROM BEING DISCHARGED INTO SHAKER AND MUD PIT ROOMS

(71) Applicant: Frank French, Carluke (GB)

(72) Inventor: Frank French, Carluke (GB)

(73) Assignee: Frank Ramsay French, Carluke (GB)

( * ) Notice: Subject to any disclaimer, the term of this patent is extended or adjusted under 35 U.S.C. 154(b) by 2 days.

(21) Appl. No.: 17/597,630

(22) PCT Filed: Sep. 26, 2019

(86) PCT No.: PCT/GB2019/000142
§ 371 (c)(1),
(2) Date: Jan. 14, 2022

(87) PCT Pub. No.: WO2021/058928
PCT Pub. Date: Apr. 1, 2021

(65) Prior Publication Data
US 2022/0243545 A1    Aug. 4, 2022

(51) Int. Cl.
*E21B 21/00* (2006.01)
*E21B 21/06* (2006.01)
(52) U.S. Cl.
CPC .................................. *E21B 21/067* (2013.01)
(58) Field of Classification Search
CPC ........................... E21B 21/067; B01D 19/0063
USPC ................................ 95/241–266; 96/193–202
See application file for complete search history.

(56) References Cited

U.S. PATENT DOCUMENTS

| 2,748,884 | A | * | 6/1956 | Erwin | ................... E21B 21/067 |
| | | | | | 96/198 |
| 2,869,673 | A | * | 1/1959 | Erwin | ................ B01D 19/0036 |
| | | | | | 96/197 |
| 3,790,930 | A | * | 2/1974 | Lamel | .................... E21B 47/16 |
| | | | | | 166/113 |

FOREIGN PATENT DOCUMENTS

GB          2081137 A  *  2/1982  ......... B01D 19/0052

\* cited by examiner

*Primary Examiner* — T. Bennett McKenzie

(57) ABSTRACT

This invention provides a Mud Gas Separator design (MGS) which prevents gas from being discharged into the shaker/mud pit rooms. It eliminates the risk of suffocation of the personnel working in these areas and the fire/explosion/environmental risks of the current MGS designs.

The Mud Gas Separator design of two MGS/liquid seals (43/76 & 57/77) in series automatically prevents gas being discharged into shaker and mud pit rooms by allowing the DIP tube liquid seal (76) of the first MGS (43) to blow-out safely into a containment chamber (49) with the second liquid seal (77) remaining intact preventing any gas from being discharged into the shaker/mud pit rooms.

A sensor system (55) at the top of the outer casing of the dip tube (52) will identify when there is a liquid seal blowout event and isolate the MGS to prevent further gas releases.

2 Claims, 5 Drawing Sheets

MUD GAS SEPARATOR DESIGN WHICH PREVENTS GAS FROM BEING DISCHARGED INTO SHAKER AND MUD PIT ROOMS

TECHNICAL FIELD

The oil industry uses Mud Gas Separators (MGS) to remove gas from the drilling mud during well control operations. There are currently two main designs of MGS which are used by the oil industry depending on the type of liquid seal used; 1. MGS with Dip tube liquid seal (FIG. 1) and 2. MGS with U tube liquid seal (FIG. 2). The two main MGS designs currently being used by the oil industry are susceptible to gas blowing out the liquid seal resulting in gas/condensate/oil being discharged 1. onto the main deck/beside rig floor (MGS with Dip tube liquid seal) resulting in fire/explosion on main deck and/or environmental spill or 2. into the shaker room and mud pit room where personnel work (MGS with U tube liquid seal) resulting in the risk of suffocation of personnel and fire/explosion inside the installation.

The oil industry MGS do not have any isolation valves which means that the liquid seal cannot be drained without the risk of gas in the MGS chamber from being vented 1. at the top of the drip tube outer casing (MGS with Dip tube liquid seal) or 2. the HVAC system (negative pressure) in the shaker room, will suck the gas from the MGS chamber into the shaker room when the liquid seal is drained (MGS with U tube liquid seal).

This invention provides a Mud Gas Separator design which prevents gas from being discharged onto the main deck or into the shaker/mud pit rooms. It eliminates the risk of suffocation of the personnel working in these areas and the fire/explosion/environmental risks of the current MGS designs.

BACKGROUND ART

FIG. 1 shows the standard oil industry MGS with Dip tube liquid seal. Well fluid (mud, condensate, oil and gas) comes from the well via the choke manifold on the rig floor at 1 and isolation valve 2 then enters the MGS 3. The gas is separated in the MGS 3 chamber which has baffle plates to aid separation of gas from liquid. The gas is vented from the MGS via a vent line 4 going to the top of the drilling derrick. The liquids (mud, condensate, oil) exit the bottom of the MGS via the Dip tube inner pipe 5 then up the inside of the DIP tube outer casing 6. The inner pipe 5 (inlet side) and outer casing 6 (outlet side) form the Dip tube liquid seal. The liquids then flow from the Dip tube via line 7 to the shaker room 8 then via line 9 to the mud pit room 10. There are two pressure transducers 12 and 13. The standard oil industry MGS with Dip tube liquid seal has a very basic pressure monitoring system and does not have a control system which automatically isolates the MGS system if there is a liquid seal blow out or gas in the shaker/mud pit room to prevent an escalation of the event. Pressure transducer 12 measures the pressure at the bottom of the liquid seal and the pressure transducer 13 measures the operating pressure of the MGS vessel developed by the back pressure of the gas flowing up the vent line 4. The pressure monitoring system does not alert personnel in sufficient time to prevent a liquid seal blow out event and relies on Human intervention to stop the operation. The liquid seal height is 14 and liquid seal drain valve 11.

FIG. 2 shows the standard oil industry MGS with U tube liquid seal. Well fluid (mud, condensate, oil and gas) comes from the well via the choke manifold on the rig floor at 21 and isolation valve 22 then enters the MGS 23. The gas is separated in the MGS 23 chamber which has baffle plates to aid separation of gas from liquid. The gas is vented from the MGS via a vent line 24 going to the top of the drilling derrick. The liquids (mud, condensate, oil) exit the bottom of the MGS via the U tube line 25 (inlet side) then up U tube outlet line 26 (outlet side). The liquids then flow from the U tube via line 27 to the shaker room 28 then via line 29 to the mud pit room 30. There are two pressure transducers 32 and 33. The standard oil industry MGS with U tube liquid seal has a very basic pressure monitoring system and does not have a control system which automatically isolates the MGS system if there is a liquid seal blow out or gas in the shaker/mud pit room to prevent an escalation of the event. Pressure transducer 32 measures the pressure at the bottom of the liquid seal and the pressure transducer 33 measures the operating pressure of the MGS vessel developed by the back pressure of the gas flowing up the vent line 24. The pressure monitoring system does not alert personnel in sufficient time to prevent a liquid seal blow out event and relies on Human intervention to stop the operation. The liquid seal height is 34 and liquid seal drain valve 31. The anti-syphon vent line 35 prevents the U tube from being emptied and goes to the top of the drilling derrick. The MGS has a line where degassed mud can be pumped from the mud pits into the MGS at 38 to help to maintain the liquid seal. The non-return valve 37 is used to prevent any backflow of gas/fluids to the mud pits. Isolation valve 36 is used to isolate the line when not in use.

If the liquid seal 5 & 6 blows out on the MGS with Dip tube liquid seal then gas/condensate/oil/mud would be discharged at the top of the outer casing 6 which is open to the atmosphere. The gas/condensate/oil/mud would be discharged beside the rig floor and onto the main deck leading to a risk of a fire/explosion on the main deck and risk of spill to the environment.

When starting to circulate through the MGS with Dip tube liquid seal there is a risk that mud overflows from the outer casing 6 when the mud in the dip tube is cold and has high gel strength which can result in a sudden surge of mud through the Dip Tube leading to an environmental incident.

The environmental risk of overflowing mud when using a MGS with Dip tube liquid seal has led the oil industry into using the MGS with U tube liquid seal on most offshore installations as this design eliminates this environmental risk. There is no environmental spill risk when using the U tube as all mud is contained within closed pipe work.

The MGS with U tube liquid seal has however introduced a far greater risk to the installation where if the liquid seal blows out 25 & 26 then gas/condensate/oil/mud is discharged into the shaker room 28 and mud pit room 30. If there are large quantities of gas discharged into the shaker room 28 and mud pit room 30 then it can 1. Suffocate the personnel working inside these areas 2. Cause a fire/explosion inside the centre of the installation causing massive damage and ultimately the loss of the installation 3. Depending on installation design the mud pit room exhaust vent can discharge gas next to the air intakes for the main power engines for the installation. This causes the main engines to go into overspeed generating excessive voltages which can cause the electrical systems on the installation to explode (for example lights fittings) resulting in numerous ignition sources for the gas to ignite leading quickly to the loss of the installation from fire/explosion. The installation power system would also shut down due to engine overspeed resulting in the installation losing the ability to move off location in an emergency situation as there would be no power available to operate the thrusters.

The standard oil industry MGS designs have the following additional problems associated with their use which the oil industry have either not identified or not addressed:—

Problem 1: The oil industry teaches personnel to incorrectly calculate the MGS Maximum Operating pressure.

The Operating Pressure within the mud gas separator is equal to the friction pressure of the gas venting out through the vent line.

If the Operating Pressure in the MGS exceeds the liquid seal pressure then the liquid seal can be blown out resulting in gas being discharged into the shaker and mud pit rooms where personnel work resulting in the risk of suffocation and fire/explosion inside the installation (U tube liquid seal MGS) or onto the main deck/beside rig floor (Dip tube liquid seal MGS) resulting in fire/explosion on main deck and/or environmental spill. This can happen because the oil industry incorrectly advises personnel to calculate the maximum operating pressure of the MGS based on the pressure gradient of the drilling mud (psi/ft, Pa/m) in the liquid seal× liquid seal height (ft, m) using the following formulae for Oilfield and Metric Units:—

Oilfield Units:

MGS max operating pressure (psi)=Mud pressure gradient (psi/ft)×liquid seal height (ft).

Metric Units:

MGS max operating pressure (Pa)=Mud pressure gradient (Pa/m)×liquid seal height (m).

When circulating out a gas condensate influx, the fluid in the liquid seal when the gas is being removed by the MGS is not the drilling mud as the condensate with pressure gradient 0.3 psi/ft (6786.2 Pa/m) will have filled the liquid seal thus reducing the MGS max operating pressure significantly.

For example, the MGS max operating pressure when the liquid seal is filled with condensate with pressure gradient 0.3 psi/ft (6786.2 Pa/m) and liquid seal height of 20 ft (6.1 m) is calculated to be 0.3 psi/ft×20 ft=6 psi (6786.2 Pa/m× 6.1 m=41395.8 Pa). However, the oil industry teaches personnel to calculate the MGS max operating pressure using the drilling mud pressure gradient being used at that time. When drilling with a mud pressure gradient of 0.7 psi/ft (15834.5 Pa/m) and liquid seal height of 20 ft (6.1 m) the oil industry teaches their personnel to calculate the MGS max operating pressure to be 0.7 psi/ft×20 ft=14 psi (15834.5 Pa/m×6.1 m=96590.5 Pa) when in fact the max operating pressure with condensate in the liquid seal is only 6 psi (41395.8 Pa).

If the MGS is being operated with a pressure of 7 psi (48263.5 Pa) which is 50% of MGS max operating pressure value defined by the oil industry, then the liquid seal will blow-out as the MGS operating pressure of 7 psi (48263.5 Pa) exceeds the liquid seal pressure of 6 psi (41395.8 Pa) when liquid seal is filled with condensate.

Problem 2: The oil industry uses a pressure monitoring system which makes personnel incorrectly think that they are operating the MGS within the MGS Maximum Operating pressure which can suddenly lead to a liquid seal blow out event when condensate starts to displace the outlet side of the liquid seal. The pressure monitoring system is not a control system and requires personnel to stop the operation manually. The pressure monitoring system only alerts personnel to a liquid seal blow out event as it is happening which means that there is no opportunity for the personnel to react in sufficient time to prevent the blow out.

The MGS with Dip tube liquid seal has two pressure transducers 12 and 13. Pressure transducer 12 measures the pressure at the bottom of the liquid seal and the pressure transducer 13 measures the operating pressure of the MGS vessel developed by the back pressure of the gas flowing up the vent line 4.

The MGS with U tube liquid seal has two pressure transducers 32 and 33. Pressure transducer 32 measures the pressure at the bottom of the liquid seal and the pressure transducer 33 measures the operating pressure of the MGS vessel developed by the back pressure of the gas flowing up the vent line 24.

The oil industry teaches their personnel that they are operating the MGS correctly as long as they keep the MGS operating pressure less than the liquid seal pressure.

For example, one oil company's advice is "Never let the mud gas separator working pressure get close to the liquid seal hydrostatic pressure during a well kill operation".

The liquid seal pressure transducers 12 and 32 measures the pressure of the fluid in the outlet side of the liquid seal. This pressure will be the mud pressure gradient in the liquid seal until it is displaced to a different fluid like condensate. When condensate starts to fill the outlet side of the liquid seal the liquid seal pressure will rapidly decrease as the lower pressure gradient fluid suddenly fills the outlet side of the liquid seal. The pressure drop will be too fast for the personnel to react to prevent a liquid seal blow out. Personnel can be operating the MGS at what they think is a safe operating pressure only to find the liquid seal suddenly blows out as the liquid seal pressure drops rapidly when it is filled with condensate.

For example, when drilling with a mud pressure gradient of 0.7 psi/ft (15834.5 Pa/m) and a liquid seal height of 20 ft (6.1 m) the liquid seal pressure transducers 12 and 32 would be reading 14 psi (96590.5 Pa). Personnel can be operating the MGS at a pressure equal to 7 psi (48263.5 Pa) which is 50% of the liquid seal pressure. If condensate suddenly fills the liquid seal then the liquid seal would only be able to support an operating pressure of 6 psi (41395.8 Pa). As the operating pressure is 7 psi (48263.5 Pa) then liquid seal will suddenly blow out with insufficient warning resulting is gas being discharged onto or into the installation.

The oil industry practice of keeping the MGS operating pressure less than the liquid seal pressure can result directly to liquid seal blow outs when a lower pressure gradient fluid like condensate displaces the mud from the liquid seal. This happens so quickly that personnel have no time to react to stop the liquid seal from blowing out.

Problem 3: The standard oil industry MGS with U tube liquid seal has a very basic pressure monitoring system and does not have a control system which automatically isolates the MGS system if there is a liquid seal blow out or gas in the shaker/mud pit room to prevent an escalation of the event. The pressure monitoring system does not alert personnel in sufficient time to prevent a liquid seal blow out event and relies on Human intervention to stop the operation.

Problem 4: There is no method of isolating the MGS with U tube liquid seal to allow the liquid seal to be safely drained without getting gas into the shaker room. The HVAC system in the shaker room produces a negative pressure which sucks any gas in the MGS chamber into the shaker room when the liquid seal is drained.

Problem 5: There is no system or method for safely managing the hydrocarbon fluids at surface once they have been through the MGS. In the past, back in the 1980's, any hydrocarbon fluids which had been through the MGS were taken through the shaker room to the mud pits where the hydrocarbon fluid was stored until it could be returned onshore for disposal. This was a highly dangerous practice as hydrocarbon fluids should not be taken into the mud pits due to the risk of a fire/explosion in the centre of the installation which would have catastrophic risk to the installation. The oil industry rightly banned any hydrocarbon fluids from being taken into the mud pits but did not develop any other method or plan for handling hydrocarbon fluids at surface. The oil industry has just said if hydrocarbon fluids are seen in the shaker room then the operation should be stopped. One oil company had a gas incident in the shaker room where the offshore team observed oil at the shakers. The offshore team stopped the job and then when draining the hydrocarbon fluids from the liquid seal gas was sucked into the shaker room by the HVAC (problem 3). The incident investigation did not identify the root cause of the incident 1. no provision was made for handling hydrocarbon fluids at surface, 2. HVAC sucked gas into shaker room. The incident investigation therefore did not take any action to produce a system which can safely deal with hydrocarbon fluids at surface and provide a method of isolating the MGS and shaker room so the liquid seal can be drained without bringing gas into the installation.

Problem 6: For a liquid seal to change from one fluid pressure gradient to a lower fluid pressure gradient fluid, the level in the MGS chamber will increase until the pressure of the lower fluid pressure gradient in inlet side of the liquid seal is equal to the pressure developed by the higher fluid pressure gradient in the outlet side of the liquid seal.

For example, when using the standard oil industry MGS with U tube liquid seal with a drilling mud pressure gradient of 0.7 psi/ft (15834.5 Pa/m) and a liquid seal height of 20 ft (6.1 m) the liquid seal pressure transducer 32 would be reading 14 psi (96590.5 Pa). This is the pressure developed by the outlet side 26 of the liquid seal containing drilling mud. If condensate fluid (0.3 psi/ft) (6786.2 Pa/m) is taken into the MGS chamber then the level in the MGS chamber 23 would have to increase until the pressure developed by the condensate in the inlet side 25 and MGS chamber 23 of the liquid seal was equal to the pressure of the mud in the outlet side of the liquid seal before condensate would rapidly start to fill outlet side of the liquid seal. The inlet height of condensate that is required to equal the pressure of the fluid on the outlet side of the liquid seal in the example used in problem 1 is calculated as follows:—

Oilfield Units:

Height of condensate (ft)=(Mud pressure gradient (psi/ft)×liquid seal height(ft))/condensate pressure gradient (psi/ft)

Height of condensate=(0.7×20)/0.3=46.67 ft

Metric Units:

Height of condensate (m)=(Mud pressure gradient (Pa/m)×liquid seal height(m))/condensate pressure gradient (Pa/m)

Height of condensate=(15834.5×6.1)/6786.2=14.2 m

The level inside the MGS chamber would have to increase by 26.67 ft (8.1 m) above the liquid seal height of 20 ft (6.1 m) before the condensate can start to displace the outlet side of the liquid seal.

The increase in fluid level inside the MGS can lead to poor gas separation from the fluid, leading to entrained gas in the fluid flowing through the liquid seal which then unloads the liquid seal as described in problem 7.

Once the condensate has displaced the outlet side 26 of the liquid seal the level of condensate in the MGS chamber will have only marginally dropped in height due to the liquid seal line volume being small, approx. 2 bbls (0.32 m3) compared to the volume of fluid required to increase the level of the MGS chamber by 26.67 ft (14.2 m), approx. 70 bbls (11.1 m3). This means that there is now approximately 46 ft (14.2 m) of condensate on the inlet side 25 of the MGS liquid seal with a hydrostatic pressure=13.8 psi (95148.0 Pa) against the outlet side 26 of the liquid seal with a hydrostatic pressure=6 psi (41395.8 Pa). This imbalance in hydrostatic pressure will result in rush of fluid and gas through the liquid seal resulting in an uncontrolled discharge of gas/condensate into the Shaker room leading to the possibility of asphyxiation of personnel and/or fire/explosion in the Shaker/Mud Pit rooms.

The standard oil industry pressure gauge MGS monitoring system cannot identify the level increase inside the MGS chamber as there are only two pressure transducers. The liquid seal pressure transducers (12 & 32) measure the hydrostatic pressure of the fluid in the outlet side (6 & 26) of the MGS and will not start to change until the condensate starts to displace the outlet side of the liquid seal. The MGS operating pressure transducers (13 & 33) measure the back pressure of the gas flowing up the vent line (4 & 24) and will not register any change in fluid level inside the MGS. This means it is currently impossible to identify when there is a risk of the MGS levels increasing resulting in a blow-out of the liquid seal event.

Problem 7: The liquid seal can unload at significantly lower operating pressures than calculated due to entrained gas in the fluid which is impossible to predict. If entrained gas starts to unload the liquid seal then the operating pressure that causes liquid seal blow-out could be significantly lower than the max operating pressure calculated using condensate 0.3 psi/ft (6786.2 Palm) fluid. This means that personnel can be operating the MGS at what would be considered very conservative operating pressures only to then find that the liquid seal has blown out. The gas can remain entrained in the fluid because of high viscosity, high flowrates or due to poor gas separation if the fluid level in the MGS chamber (3 and 23) increases when fluids with lower pressure gradient are processed through the MGS (see Problem 6 above).

DISCLOSURE OF INVENTION

The major problem with the previous MGS designs is that it is not possible to predict when a liquid seal blow-out event is going to occur as small amounts of gas entrained in the fluids can break out and cause the blowout event (problem 7).

Pressure sensors cannot identify when there is entrained gas in the fluid entering the liquid seal which means it is impossible to identify when entrained gas is going to unload the liquid seal. The entrained gas in the fluid will unload the liquid seal as it expands up the outlet side of the Dip or U tube liquid seals and cause a liquid seal blowout at significantly lower pressures than calculated, even lower than when using the 0.3 psi/ft (6786.2 Pa/m) pressure gradient in the calculations.

As it is impossible to prevent an entrained gas liquid seal blowout, then the Mud Gas Separator design must be able to safely take a liquid seal blowout without it becoming a major risk to the installation.

The way this Mud Gas Separator design solves the entrained gas problem is by having two MGS/liquid seals in series. The First MGS liquid seal is a DIP TUBE which purpose is to allow any liquid seal blow out events to occur with the second MGS liquid seal is there to protect the shaker/mud pit rooms. The First MGS liquid seal is located within a containment chamber which is there to prevent gas & fluid from being discharged beside the rig floor or onto the main deck when there is a blowout event in the First MGS liquid seal.

This invention provides a Mud Gas Separator design which automatically solves the entrained gas liquid seal blowout problem by allowing this unpredictable liquid seal blow-out event to occur while safely containing the fluids and preventing gas being blown through to the shaker/mud pit rooms.

The principle behind this invention is that there are two Mud Gas Separators in series so that if the first MGS liquid seal blows out the second MGS liquid seal will prevent gas being discharged into the shaker/mud pit rooms. The First MGS has a dip tube liquid seal which is enclosed within the containment chamber. If the first MGS liquid seal blows out then the containment chamber prevents gas/condensate/oil/mud from being discharged beside the rig floor and onto the main deck thus eliminating the fire/explosion/environmental risk of the standard oil industry MGS with dip tube liquid seal. The second MGS can either be a dip tube liquid seal; or U tube liquid seal (in all further descriptions and figures only the U tube liquid seal is shown on the second MGS for simplicity). The second MGS acts as the seal which prevents the gas/condensate/oil/mud going through to the shaker/mud pit rooms when the First MGS dip tube liquid seal blows out.

The new MGS design will have a control system for additional protection which will be linked to isolation valves on the MGS system which will close the valves to prevent any gas/fluid from being discharged into the shaker/mud pit rooms if there is a major risk of a liquid seal blow-out or if a liquid seal blow-out has occurred.

The new MGS design will use the trip tank to hold any hydrocarbon fluids coming through the liquid seals so hydrocarbons are not taken to the shaker/mud pit rooms.

The new MGS Control system will have 3 main safety systems:—
1. Liquid seal blow-out monitoring by the control system so it can shut down the pumps and isolate the MGS by closing the isolation valves if a blow through event has occurred in the First MGS Dip tube liquid seal: The First MGS Dip tube liquid seal will have a sensor system at the top of the outer casing of the dip tube which will be able to identify when there is a liquid seal blowout event in the First MGS dip tube liquid seal. When the control system identifies a liquid seal blow-out then it would stop the pumps (rig pumps and cement pumps) circulating the fluid round the well and close the isolation valves to prevent any further gas/fluid from being blown through the liquid seals on both the first and second MGS thus eliminating any risk of gas being discharged into the shaker room and mud pit room.
2. Sensors in shaker/mud pit room will be linked to control system so if gas is registered on the sensors the control system would shut down the pumps and isolate the MGS by closing the isolation valves. If the gas sensor in the shaker/mud pit rooms register gas then the control system would stop the pumps (rig pumps and cement pumps) circulating the fluid round the well and close the isolation valves to prevent any further gas/fluid from being blown through the liquid seals on both the first and second MGS thus eliminating any risk of gas being discharged into the shaker room and mud pit room.
3. The MGS design will also have an enhanced pressure monitoring system which monitors operating pressures, fluid heights and fluid pressure gradients in MGS and liquid seals. The control system would automatically stop the pumps and isolate the MGS to prevent any risk of gas being discharged into the shaker and mud pit rooms if there is a risk of a blow through event.
   Note: pressure sensors on their own cannot predict all blow-out events as they cannot identify if gas has become entrained into the fluid which can then unload the liquid seal at significantly lower operating pressures.

Figure 1:
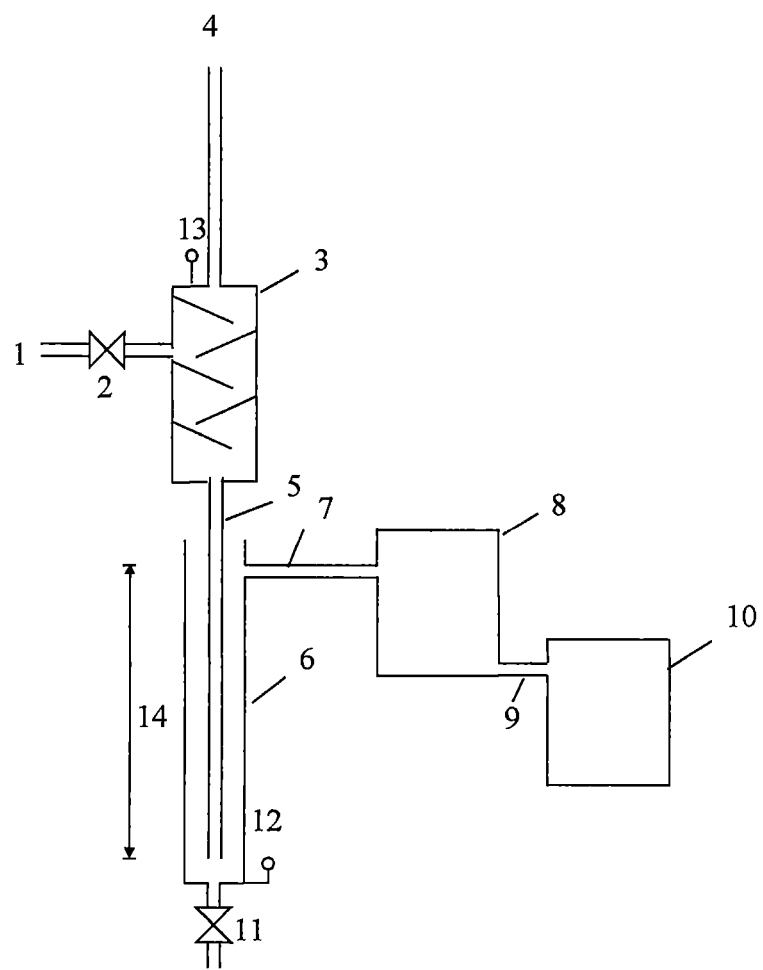
FIG. 1 shows the standard oil industry MGS with Dip tube liquid seal. Well fluid (mud, condensate, oil and gas) comes from the well via the choke manifold on the rig floor at 1 and isolation valve 2 then enters the MGS 3. The gas is separated in the MGS 3 chamber which has baffle plates to aid separation of gas from liquid. The gas is vented from the MGS via a vent line 4 going to the top of the drilling derrick. The liquids (mud, condensate, oil) exit the bottom of the MGS via the Dip tube inner pipe 5 then up the inside of the DIP tube outer casing 6. The inner pipe 5 (inlet side) and outer casing 6 (outlet side) form the Dip tube liquid seal. The liquids then flow from the Dip tube via line 7 to the shaker room 8 then via line 9 to the mud pit room 10. There are two pressure transducers 12 and 13. The standard oil industry MGS with Dip tube liquid seal has a very basic pressure monitoring system and does not have a control system which automatically isolates the MGS system if there is a liquid seal blow out or gas in the shaker/mud pit room to prevent an escalation of the event. Pressure transducer 12 measures the pressure at the bottom of the liquid seal and the pressure transducer 13 measures the operating pressure of the MGS vessel developed by the back pressure of the gas flowing up the vent line 4. The pressure monitoring system does not alert personnel in sufficient time to prevent a liquid seal blow out event and relies on Human intervention to stop the operation. The liquid seal height is 14 and liquid seal drain valve 11.

Option 1: If the liquids have no hydrocarbons then they can be taken directly to the shaker room 81 via valve 65 and line 66 then through line 82 to mud pit room 83.

Option 2: If the liquids contain condensate or oil (hydrocarbons) then they must not be taken to the shaker and mud pit rooms due to the risk of fire/explosion in these enclosed areas. The liquids which contain condensate or oil (hydrocarbons) will be via taken via valve 64 and line 67 to the trip tank 80 where the hydrocarbon liquids can be drained to transportation tanks via drain valve 78 to be taken onshore for safe disposal. If there are no hydrocarbons in the fluids taken to the trip tank then they can be taken back to the mud pits via drain valve 79. If there are no hydrocarbons in the fluids taken to the trip tank then the trip tank can be allowed to fill up until it overflows into line 84 which takes the fluids to the shaker room 81 then through line 82 to mud pit room 83.

The trip tank 81 should be located outside any internal areas of the installation so if there is any gas vented off from the fluids then the gas goes into the atmosphere and not into the internal areas of the rig.

Figure 5:
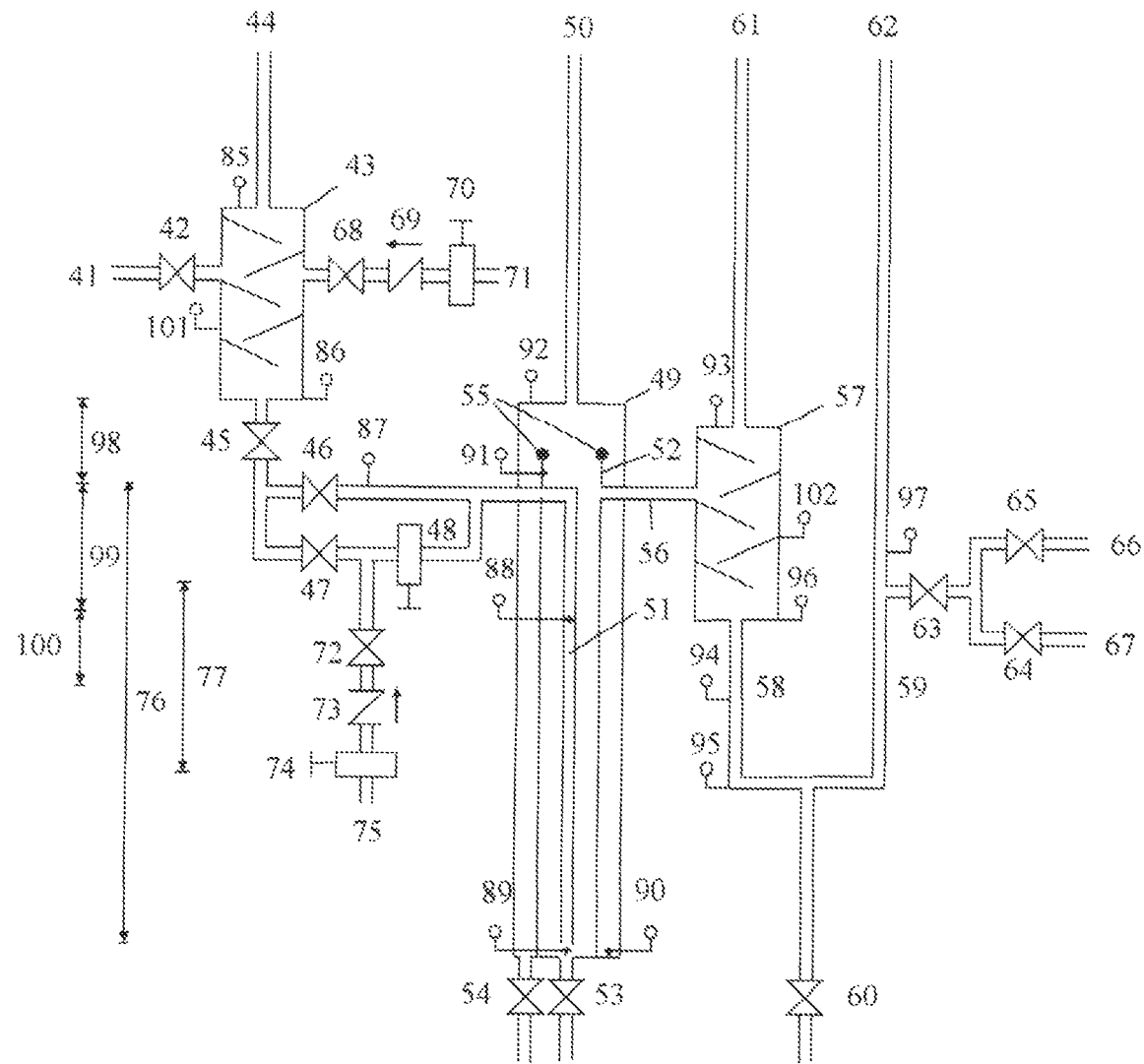

FIG. 5 shows how additional Pressure Transducers (PT) and their positions could be used with a control system to identify when there is a risk of a blow through condition so the control system will automatically stop the operation. The position and number of Pressure Transducers (PT) shown are only a guide to illustrative how the current standard oil industry MGS two x Pressure Transducers monitoring system (which requires human interpretation) could be changed so there is a control system which will automatically stop the operation without human interpretation.

The Control system would stop the operation by shutting down the pumps circulating the fluids around the well, and close isolation valves 42,45, 63, 68 and 72.

PT 85 measures the operating pressure of the First MGS developed by the back pressure of the gas flowing up the vent line 44. The control system would stop the operation if the operating pressure reached a pressure equal to the liquid seal height (ft, m) 76× condensate pressure gradient 0.3 psi/ft (6786.2 Pa/m)×a suitable safety factor.

PT 89 measures the pressure at the bottom of the First MGS Dip tube liquid seal

PT 101 measures the pressure inside the First MGS located between the inlet line and the bottom of the First MGS so that fluid gradients inside the First MGS can be calculated. PT 101 pressure transducer can also be used to determine when the fluid level in the First MGS is above the PT 101 pressure transducer height. If the fluid level is above PT 101 then the PT 101 pressure would be greater than the PT 85 pressure.

PT 86 & 87 and 87 & 88 are used to calculate the pressure gradient of the fluid using the known height between the PTs, height 98 and 99 respectively. An estimate of the level of the fluid in the First MGS chamber 43 can be made using the pressure measured at PT 86 and the pressure gradient of the fluid between PT 86 & 87. The PT pairs 86 & 87, 86 & 88, 86 & 89, 87 & 88, 87 & 89, 88 & 89 and 86 & 101 are used to calculate the pressure gradient of the fluid in the inlet side of the liquid seal using the known heights between each PTs. The control system will monitor densities in the inlet side of the First MGS Dip tube liquid seal and stop the operation if the fluid level in the First MGS chamber increases above a set height or fluid pressure gradients drop below 0.3 psi/ft (6786.2 Pa/m).

PT 93 measures the operating pressure of the Second MGS developed by the back pressure of the gas flowing up the vent line 61. The control system would stop the operation if the operating pressure reached a pressure equal to the liquid seal height (ft, m) 77×condensate pressure gradient 0.3 psi/ft (6786.2 Pa/m)×a suitable safety factor.

PT 95 measures the pressure at the bottom of the Second MGS U tube liquid seal (or DIP tube, only U tube shown in FIG. 5)

PT 102 measures the pressure inside the Second MGS located between the inlet line and the bottom of the Second MGS so that fluid gradients inside the Second MGS can be calculated. PT 102 pressure transducer can also be used to determine when the fluid level in the Second MGS is above the PT 102 pressure transducer height. If the fluid level is above PT 102 then the PT 102 pressure would be greater than the PT 93 pressure.

PT 94 & 96 are used to calculate the pressure gradient of the fluid using the known height between the PTs, height 100. An estimate of the level of the fluid in the Second MGS chamber 57 can be made using the pressure measured at PT 96 and the pressure gradient of the fluid between PT 94 & 96. The PT pairs 94 & 95, 94 & 96, 95 & 96 and 96 & 102, are used to calculate the pressure gradient of the fluid in the inlet side of the liquid seal using the known heights between each PTs. The control system will monitor densities in the inlet side of the Second MGS Dip tube liquid seal and stop the operation if the fluid level in the Second MGS chamber increases above a set height or fluid pressure gradients drop below 0.3 psi/ft (6786.2 Pa/m).

The following pressure transducers should not see any pressure in normal operations. The control system will stop the operation as detailed above if pressure is seen on any of the PTs PT 90 is at the bottom of the containment chamber 49.

PT 91 is just above the Dip tube liquid seal outlet side flowline.

PT 92 is at the top of the containment chamber 49.

PT 93 is at the top of the Second MGS chamber and should see no pressure if all of the gas has been separated from the fluids in the First MGS chamber.

PT 97 is at the bottom of the anti-syphon vent line 62.

BEST MODE FOR CARRYING OUT THE INVENTION

The new MGS has been designed to address the seven problems identified with the current oil industry MGS as detailed below:—

Problem 1: The oil industry teaches personnel to incorrectly calculate the MGS Maximum Operating pressure.

Solution 1: The new MGS has a control system which monitors the operating pressure, fluid gradients and levels in the inlet side of the MGS and will automatically stop the operation and isolate the system to prevent a liquid seal blow out event.

Problem 2: The oil industry uses a pressure monitoring system which makes personnel incorrectly think that they are operating the MGS within the MGS Maximum Operating pressure which can suddenly lead to a liquid seal blow out event when condensate starts to displace the outlet side of the liquid seal.

Solution 2: The new MGS has a control system which monitors the operating pressure, fluid gradients and levels in the inlet side of the MGS and will automatically stop the operation and isolate the system to prevent a liquid seal blow out event.

Problem 3: The standard oil industry MGS with U tube liquid seal has a very basic pressure monitoring system and does not have a control system which automatically isolates the MGS system if there is a liquid seal blow out or gas in the shaker/mud pit room to prevent an escalation of the event. The pressure monitoring system does not alert personnel in sufficient time to prevent a liquid seal blow out event and relies on Human intervention to stop the operation.

Solution 3: The new MGS has a control system which monitors the operating pressure, fluid gradients and levels in the inlet side of the MGS and will automatically stop the operation and isolate the system to prevent a liquid seal blow out event.

Problem 4: There is no method of isolating the MGS with U tube liquid seal to allow the liquid seal to be safely drained without getting gas into the shaker room.

Solution 4: The new MGS has a control system which will isolate the MGS and shaker room to allow the liquid seals to be drained without the HVAC system sucking gas into the shaker room. The new MGS also has a separate system (72, 73, 74 and 75) which then allows the liquid seals to be re-filled with fluid from the mud pits before opening the MGS and shaker room isolation valves.

Problem 5: There is no system or method for safely managing the hydrocarbon fluids at surface once they have been through the MGS.

Solution 5: The new MGS has been designed so that the trip tank (80) can be used to store the fluids containing hydrocarbons then the fluids decanted into suitable transport containers to be sent onshore for disposal.

Problem 6: For a liquid seal to change from one fluid pressure gradient to a lower fluid pressure gradient fluid, the level in the MGS chamber will increase until the pressure of the lower fluid pressure gradient in inlet side of the liquid seal is equal to the pressure developed by the higher fluid pressure gradient in the outlet side of the liquid seal.

The increase in fluid level inside the MGS can lead to poor gas separation from the fluid leading to entrained gas in the fluid flowing through the liquid seal which then unloads the liquid seal as described in problem 7.

The level increase in the MGS can also lead to an imbalance in hydrostatic pressure when the outlet side of the liquid seal is displaced to the lower fluid pressure gradient. This will result in rush of fluid (possibly containing gas) through the liquid seal resulting in an uncontrolled discharge of gas/condensate into the Shaker room leading to the possibility of asphyxiation of personnel and/or fire/explosion in the Shaker/Mud Pit rooms.

Solution 6: The new MGS has a control system which monitors the operating pressure, fluid gradients and levels in the inlet side of the liquid seal/MGS chamber and will automatically stop the operation and isolate the system to prevent a liquid seal blow out event. If the MGS chamber has a high level of lower pressure gradient fluid then the MGS control system will stop the operation and isolate the system. The liquid seal would then be drained. Valves 45 and 47 opened and choke 48 used to lower the level of the fluid in the MGS in a controlled manner into the liquid seal. The draining of the fluid into the liquid seal can be repeated until the MGS chamber has been emptied. The liquid seal would be re-filled with a fluid with a pressure gradient equal to the fluid returning from the well and the well control operation resumed.

Problem 7: The liquid seal can unload at significantly lower operating pressures due to entrained gas in the fluid which is impossible to predict.

Pressure sensors cannot identify when there is entrained gas in the fluid entering the liquid seal which means it is impossible to identify when entrained gas is going to unload the liquid seal.

Solution 7: The new MGS has been designed to safely take a liquid seal blowout without it becoming a major risk to the installation.

The way this Mud Gas Separator design solves the entrained gas problem is by having two liquid seals. The First liquid seal is a DIP tube which purpose is to allow any liquid seal blow out events to occur with the second liquid seal there to protect the shaker/mud pit rooms. The First liquid seal is located within a containment chamber which is there to safely deal with any liquid seal blow out events.

INDUSTRIAL APPLICABILITY

Figure 2:
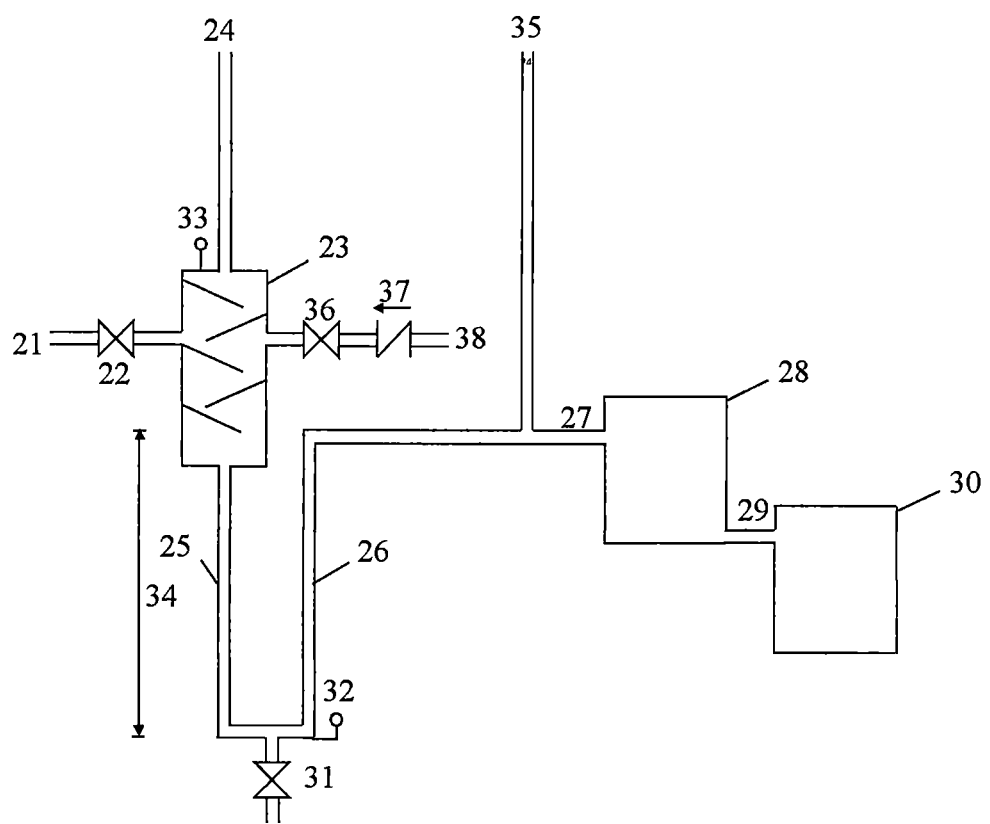
FIG. 2 shows the standard oil industry MGS with U tube liquid seal. Well fluid (mud, condensate, oil and gas) comes from the well via the choke manifold on the rig floor at 21 and isolation valve 22 then enters the MGS 23. The gas is separated in the MGS 23 chamber which has baffle plates to aid separation of gas from liquid. The gas is vented from the MGS via a vent line 24 going to the top of the drilling derrick. The liquids (mud, condensate, oil) exit the bottom of the MGS via the U tube line 25 (inlet side) then up U tube outlet line 26 (outlet side). The liquids then flow from the U tube via line 27 to the shaker room 28 then via line 29 to the mud pit room 30. There are two pressure transducers 32 and 33. The standard oil industry MGS with U tube liquid seal has a very basic pressure monitoring system and does not have a control system which automatically isolates the MGS system if there is a liquid seal blow out or gas in the shaker/mud pit room to prevent an escalation of the event. Pressure transducer 32 measures the pressure at the bottom of the liquid seal and the pressure transducer 33 measures the operating pressure of the MGS vessel developed by the back pressure of the gas flowing up the vent line 24. The pressure monitoring system does not alert personnel in sufficient time to prevent a liquid seal blow out event and relies on Human intervention to stop the operation. The liquid seal height is 34 and liquid seal drain valve 31. The anti-syphon vent line 35 prevents the U tube from being emptied and goes to the top of the drilling derrick. The MGS has a line where degassed mud can be pumped from the mud pits into the MGS at 38 to help to maintain the liquid seal. The non-return valve 37 is used to prevent any backflow of gas/fluids to the mud pits. Isolation valve 36 is used to isolate the line when not in use.
Figure 3:
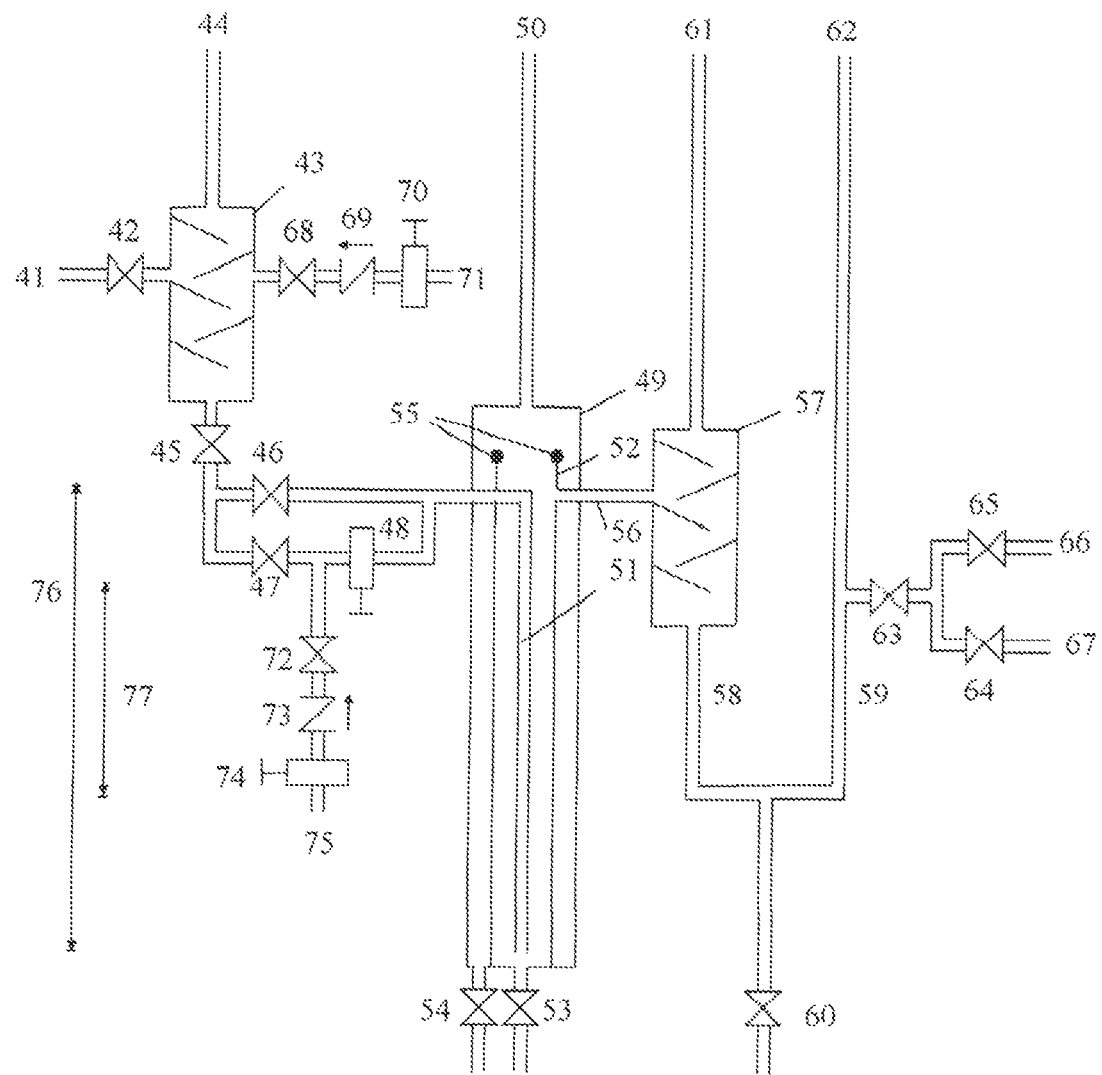
FIG. 3 shows the MGS invention which automatically prevents gas/condensate/oil/mud from being discharged into the shaker and mud pit rooms. Well fluid (mud, condensate, oil and gas) comes from the well via the choke manifold on the rig floor at 41 and isolation valve 42 then enters the First MGS 43. The gas is separated in the First MGS 43 chamber which has baffle plates to aid separation of gas from liquid. The gas is vented from the First MGS via a vent line 44 going to the top of the drilling derrick. In normal operation the liquids (mud, condensate, oil) exit the bottom of the First MGS via isolation valve 45 through manifold valve 46 to the Dip tube inner pipe 51 then up the inside of the DIP tube outer casing 52. The inner pipe 51 and outer casing 52 form the Dip tube. The containment chamber 49 is designed to catch any gas/condensate/oil/mud which blows through the First MGS dip tube liquid seal. Containment chamber 49 has a gas vent line 50 going to the top of the drilling derrick. At the top of the DIP tube outer casing 52 there is a sensor system 55 which will be able to identify when there is a liquid seal blowout event in the First MGS dip tube seal. When the sensor system 55 identifies a liquid seal blow-out then it would stop the pumps circulating the fluid round the well and close the isolation valves 42, 45, 63, 68, 72 to prevent any further fluid from blowing through the liquid seals on both the first and second MGS thus eliminating any risk of gas being discharged into the shaker room and mud pit room. In normal operation the liquids (mud, condensate, oil) would flow from the DIP tube outer casing 52 through line 56 into the Second MGS chamber 57. The second MGS chamber 57 has baffle plates to aid separation of gas from liquid. The second MGS liquid seal can be either 1. The dip tube or 2. U tube design (note only U tube design shown here to simplify figures). The gas is vented from the second MGS via a vent line 61 going to the top of the drilling derrick. The liquids (mud, condensate, oil) exit the bottom of the MGS via the U tube inlet line 58 then up U tube outlet line 59. The liquids then flow from the U tube via isolation valve 63 to a manifold. If the liquids are only mud (no hydrocarbons) then they can be taken directly to the shaker and mud pit rooms via valve 65 and line 66. If the liquid contain condensate or oil (hydrocarbons) then they must not be taken to the shaker and mud pit rooms due to the risk of fire/explosion in these enclosed areas. The liquids which contain condensate or oil (hydrocarbons) will be via taken via valve 64 and line 67 to the trip tank where the hydrocarbon liquids can be transferred to transportation tanks to be takin onshore for safe disposal. The liquid seal height is 76 for the First MGS and 77 for the second MGS. The anti-syphon vent line 62 prevents the U tube from being emptied and goes to the top of the drilling derrick. The First MGS has a line where degassed, mud can be pumped from the mud pits into the MGS at 71 to help to maintain the liquid seal. The choke 70 is used to control the flowrate of the degassed mud being taken into the MGS. The non-return valve 69 is used to prevent any backflow of gas/fluids to the mud pits. Isolation valve 68 is used to isolate the line when not in use. The first MGS liquid seal has a drain valve 53, the second MGS liquid seal has a drain valve 60, the containment chamber has a drain valve 54. Valves 46, and 47 are closed when it is required to refill the liquid seals with a different fluid pressure gradient. The refill line 75 is where fluids of different densities can be pumped from the mud pits into the liquid seals. The choke 74 is used to control the flowrate of the fluids being used to refill the liquid seal. The non-return valve 73 is used to prevent any backflow of gas/fluids to the mud pits. Isolation valve 72 is used to isolate the line when not in use. The choke 48 is used to control the flowrate of the fluids when lowering the liquid height in the First MGS chamber.
Figure 4:
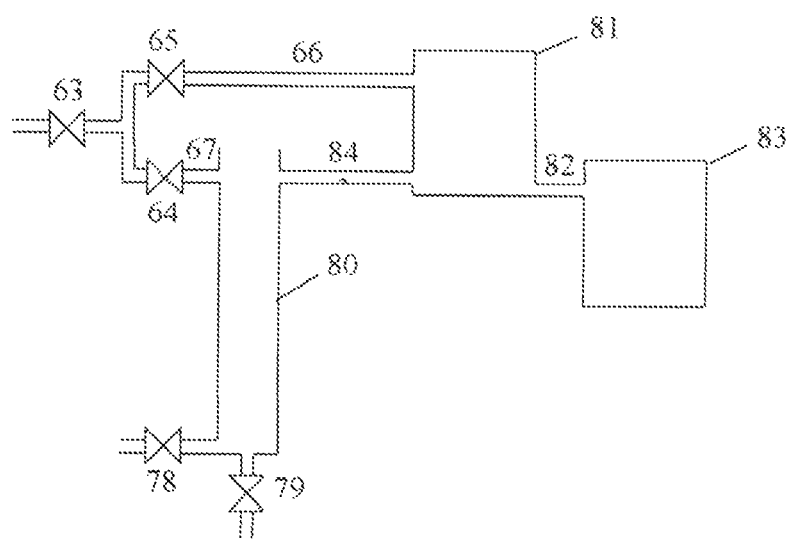
FIG. 4 shows the two return flow options from the Mud Gas Separator to the Mud pits.

The oil industry uses Mud Gas Separators (MGS) to remove gas from the drilling mud during well control operations. There are currently two main designs of MGS which are used by the oil industry depending on the type of liquid seal used; 1. MGS with Dip tube liquid seal (FIG. 1) and 2. MGS with U tube liquid seal (FIG. 2). The two main MGS designs currently being used by the oil industry are susceptible to gas blowing out the liquid seal resulting in gas/condensate/oil being discharged 1. onto the main deck/ beside rig floor (MGS with Dip tube fluid seal) resulting in fire/explosion on main deck and/or environmental spill or 2. into the shaker room and mud pit room where personnel work (MGS with U tube liquid seal) resulting in the risk of suffocation of personnel and fire/explosion inside the installation.

The oil industry MGS do not have any isolation valves which means that the liquid seal cannot be drained without the risk of gas in the MGS chamber from being vented 1. at the top of the drip tube outer casing (MGS with Dip tube liquid seal) or 2. the HVAC system (negative pressure) in the shaker room, will suck the gas from the MGS chamber into the shaker room when the liquid seal is drained (MGS with U tube liquid seal).

This invention provides a Mud Gas Separator design which prevents gas from being discharged onto the main deck or into the shaker/mud pit rooms. It eliminates the risk to personnel working in these areas and the fire/explosion/ environmental risks of the current MGS designs.

The use of the new MGS would be a significant improvement in the safety of all worldwide drilling operations. It would prevent personnel working in the shaker and mud pit rooms from being suffocated and prevent fires/expositions inside the shaker and mud pit rooms from destroying the installation.

The oil industry has failed to identified this process safety hazard in all of the incident investigations that have been performed into gas releases, fires, explosions in the shaker and pit rooms over the years. The use of the new MGS would eliminate this process safety hazard. It is envisaged that the oil industry would want to eliminate this process safety hazard and install the new MGS on all worldwide drilling operations.

The invention claimed is:

1. A drilling mud gas separating system comprising a first mud gas separator (43) and a second mud gas separator (57) connected in series, wherein the first mud gas separator (43) comprises a vessel having a closed top with a vent line (44) formed therein and a first liquid seal of an inner pipe (51) and outer casing (52) that forms a first dip tube, located in a containment chamber (49) comprising a vent line (50), the first dip tube having an outlet (56) connected to the second mud gas separator (57), wherein the second mud separator (57) comprises a vessel a closed top with a vent line (61) formed therein and a second liquid seal of either a U tube inlet line (58) then up a U tube outlet line (59) that forms a U Tube liquid seal or a second dip tube liquid seal.

2. The mud gas separation system of claim 1, further comprising a sensor system (55) located at the top of the outer casing (52) which, through a monitoring and control system, is interlocked with an isolation valve (42) at a first inlet to the first mud gas separator (43), an isolation valve (45) at an outlet of the first mud gas separator (43), an isolation valve (63) downstream of the second liquid seal, an isolation valve (68) on a line (71) at a second inlet to the first mud gas separator (43), an isolation valve (72) on a re-fill line (75) to the first dip tube (51, 52).

* * * * *